United States Patent
Ogawa et al.

(10) Patent No.: US 9,732,653 B2
(45) Date of Patent: Aug. 15, 2017

(54) REDUCING AGENT TANK AND WORK VEHICLE

(71) Applicant: KOMATSU LTD., Tokyo (JP)

(72) Inventors: Satoshi Ogawa, Osaka (JP); Taisuke Kusaba, Hirakata (JP); Yasutaka Kuse, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/359,364

(22) PCT Filed: Jan. 8, 2014

(86) PCT No.: PCT/JP2014/050119
§ 371 (c)(1),
(2) Date: May 20, 2014

(87) PCT Pub. No.: WO2014/199649
PCT Pub. Date: Dec. 18, 2014

(65) Prior Publication Data
US 2015/0192052 A1 Jul. 9, 2015

(51) Int. Cl.
*F01N 3/28* (2006.01)
*F01N 3/20* (2006.01)

(52) U.S. Cl.
CPC .......... *F01N 3/2896* (2013.01); *F01N 3/208* (2013.01); *F01N 3/2066* (2013.01);
(Continued)

(58) Field of Classification Search
CPC ........ F01N 5/02; F01N 2240/02; F01N 3/043; F01N 13/14; F01P 2060/16
(Continued)

(56) References Cited

U.S. PATENT DOCUMENTS 6,063,350 A * 5/2000 Tarabulski et al. ........ 423/239.1
6,266,955 B1 * 7/2001 Liang et al. .................... 60/274
(Continued)

FOREIGN PATENT DOCUMENTS

CN 1954135 A 4/2007
CN 101044300 A 9/2007
(Continued)

OTHER PUBLICATIONS

Machine Translation of JP 2010071263, Translated on Jul. 13, 2015.*

*Primary Examiner* — Patrick Maines
(74) *Attorney, Agent, or Firm* — Drinker Biddle & Reath LLP

(57) ABSTRACT

A reducing agent tank is provided which can improve a heat transfer efficiency to a reducing agent and transfer heat to the reducing agent in a height direction of the reducing agent tank without unevenness. The reducing agent tank includes a container main body which has an upper face and a bottom face and constitutes a space for storing the reducing agent between the upper face and the bottom face, and a heat exchanger which performs heat exchange with the reducing agent. The heat exchanger has penetrating portions and inclined portions. The penetrating portions penetrate to the upper face of the container main body and extend into the space. The inclined portions are inclined relative to the penetrating portions at a position different from each other in an extending direction of the penetrating portions and extend toward a side of the bottom face.

17 Claims, 12 Drawing Sheets

(52) U.S. Cl.
CPC ...... *F01N 2590/08* (2013.01); *F01N 2610/02* (2013.01); *F01N 2610/10* (2013.01); *F01N 2610/1406* (2013.01); *Y02T 10/24* (2013.01)

(58) Field of Classification Search
USPC .......................................... 60/295, 301, 320
See application file for complete search history.

(56) References Cited

U.S. PATENT DOCUMENTS

| | | | | |
|---|---|---|---|---|
| 2007/0059222 A1* | 3/2007 | Satou et al. | ................. | 422/177 |
| 2007/0079599 A1* | 4/2007 | Osaku et al. | ................. | 60/283 |
| 2007/0196243 A1* | 8/2007 | Osaku et al. | ................. | 422/102 |
| 2009/0139214 A1* | 6/2009 | Reed | ............................. | 60/286 |
| 2012/0183459 A1* | 7/2012 | Rocheux | ........... | B01D 39/1623 423/212 |
| 2013/0167622 A1* | 7/2013 | Frivik | ......................... | 73/61.46 |
| 2015/0192051 A1* | 7/2015 | Ogawa | ................ | B01D 35/005 60/295 |

FOREIGN PATENT DOCUMENTS

| | | | |
|---|---|---|---|
| CN | 101052788 A | 10/2007 | |
| CN | 101878354 A | 11/2010 | |
| FR | 2775735 A1 * | 9/1999 | ............. F02M 37/04 |
| JP | 3686668 B1 * | 8/2005 | ........... F01N 3/2066 |
| JP | 2005-291165 A | 10/2005 | |
| JP | 2005291165 A * | 10/2005 | ............... F01N 3/08 |
| JP | 2006-112406 A | 4/2006 | |
| JP | 2010-071263 A | 4/2010 | |
| JP | 2010071263 A * | 4/2010 | |
| JP | 2010-216306 A | 9/2010 | |
| JP | 2010216306 A * | 9/2010 | |
| JP | 2011-137441 A | 7/2011 | |
| JP | 2012-219625 A | 11/2012 | |
| JP | 2012-237232 A | 12/2012 | |
| JP | 2013-515256 A | 5/2013 | |

* cited by examiner

REDUCING AGENT TANK AND WORK VEHICLE

TECHNICAL FIELD

The present invention relates to a reducing agent tank and a work vehicle.

BACKGROUND ART

Work vehicles such as a hydraulic excavator, a bulldozer, a wheel loader, and the like have an exhaust gas treatment device. For example, a diesel particulate filter device (DPF), a diesel oxidation catalyst device (DOC), a selective catalytic reduction device (SCR), and the like are available as exhaust gas treatment devices. Particularly, the selective catalytic reduction device reduces nitrogen oxide contained in an exhaust gas to purify the exhaust gas. A reducing agent used for this exhaust gas treatment is stored in a reducing agent tank.

When the reducing agent is frozen in the tank, the reducing agent cannot be supplied to the exhaust gas treatment device. Therefore, for the purpose of preventing freezing of the reducing agent in the reducing agent tank, the technique of arranging a heat exchanger in the reducing agent tank to heat the reducing agent has been proposed. For example, Japanese Patent Laying-Open No. 2010-71263 (PTD 1) discloses an aqueous urea solution tank in which a cooling water pipe through which engine cooling water flows for heating aqueous urea solution is configured to be suspended downward from a top cover which closes an opening of an upper face of a tank main body and bent in a periphery of a bottom portion of the tank main body, extend horizontally, and reach a turning portion.

CITATION LIST

Patent Document

PTD 1: Japanese Patent Laying-Open No. 2010-71263

SUMMARY OF INVENTION

Technical Problem

For the purpose of improving the heat transfer efficiency to a reducing agent, a heat exchanger preferably has a long path length in a reducing agent tank to increase a surface area. Further, in the reducing agent tank, the frozen reducing agent is preferably thawed without unevenness.

The present invention was achieved in view of the problem described above, and its main object is to provide a reducing agent tank capable of improving a heat transfer efficiency to a reducing agent and performing heat transfer to the reducing agent in a height direction of the reducing agent tank without unevenness.

Solution to Problem

A reducing agent tank of the present invention includes a container main body and a heat exchanger. The container main body has an upper face and a bottom face, and constitutes a space for storing a reducing agent between the upper face and the bottom face. The heat exchanger performs heat exchange with the reducing agent. The heat exchanger includes a penetrating portion, a first inclined portion, and a second inclined portion. The penetrating portion penetrates through the upper face of the container main body and extends into the space. The first inclined portion is inclined relative to the penetrating portion and extends toward a side of the bottom face. The second inclined portion is inclined relative to the penetrating portion at a position different from the first inclined portion in an extending direction of the penetrating portion and extends toward a side of the bottom face.

In the present description, the reducing agent and a precursor of the reducing agent are collectively referred to as "reducing agent."

According to the reducing agent tank of the present invention, the first and second inclined portions are provided, so that a path length of the heat exchanger becomes longer, so that a surface area of the heat exchanger is increased. Since a heat transfer area from the heat exchanger to the reducing agent can be increased, the heat transfer efficiency to the reducing agent can be improved. The first and second inclined portions are arranged at different positions in the extending direction of the penetrating portion, so that the position at which the first inclined portion radiates heat and the position at which the second inclined portion radiates heat are differed in a height direction of the container main body. Thus, unevenness in the heat transfer to the reducing agent in the height direction of the reducing agent tank can be reduced, so that heat can be transferred to the reducing agent without unevenness in the height direction of the reducing agent tank.

In the reducing agent tank described above, the heat exchanger includes a first pipeline which guides a heat exchange medium into the container main body and a second pipeline which allows the heat exchange medium to flow out from the container main body. The first pipeline has the first inclined portion. The second pipeline has the second inclined portion. In such a manner, also in the planar view of the container main body, the positions at which the first and second inclined portions radiate heat are differed, so that unevenness in the heat transfer to the reducing agent can be reduced effectively.

In the reducing agent tank described above, the first inclined portion is arranged closer to the upper face than the second inclined portion. The reducing agent tank further includes a suction pipe which sucks out the reducing agent stored in the container main body. The suction pipe has a portion which extends along the first pipeline. The first inclined portion is arranged closer to the upper face than the second inclined portion, so that the suction pipe can extend along the first pipeline for a long distance. Accordingly, a reducing tank which is advantageous in thawing of the suction pipe and prevention of freezing of the suction pipe can be achieved.

In the reducing agent tank described above, an end portion of the first inclined portion on a side of leaving apart from the penetrating portion is arranged closer to the upper face than an end portion of the second inclined portion on a side close to the penetrating portion. In such a manner, the first and second inclined portions can be arranged without overlapping in a height direction of the reducing agent tank, so that the positions at which the first and second inclined portions radiate heat can be arranged more apart from each other. Thus, unevenness in the heat transfer to the reducing agent can be reduced effectively.

The reducing agent tank further includes a sensor unit which extends from the upper face to the bottom face of the container main body. At least one of the first inclined portion and the second inclined portion comes closer to the sensor unit as leaving apart from the penetrating portion. In such a manner, heat can be transferred efficiently to the sensor unit and the reducing agent in the periphery of the sensor unit, so that the detection accuracy of the state of the reducing agent by the sensor unit can be improved.

A work vehicle of the present invention includes an engine, an exhaust gas treatment device which performs treatment to an exhaust gas from the engine by a reductive reaction, any one of the reducing tanks described above, and a reducing agent injection device which injects the reducing agent sucked out from the reducing agent tank to the exhaust gas guided to the exhaust gas treatment device. Accordingly, a work vehicle can be provided which includes a reducing agent tank capable of improving the heat transfer efficiency to the reducing agent and transferring heat to the reducing agent without unevenness.

Advantageous Effects of Invention

As described above, according to the present invention, the heat transfer efficiency to the reducing agent can be improved, and unevenness in the heat transfer to the reducing agent in the height direction of the reducing agent tank can be reduced.

DESCRIPTION OF EMBODIMENTS

Hereinafter, an embodiment will be described with reference to the drawings.

Firstly, a configuration of a hydraulic excavator will be described with reference to FIG. 1, as one example of work vehicles to which an idea of the present invention is applicable. It should be noted that the present invention is applicable to work vehicles such as a wheel loader, a bulldozer, and the like provided with an engine unit including an exhaust gas treatment unit.

Figure 1:
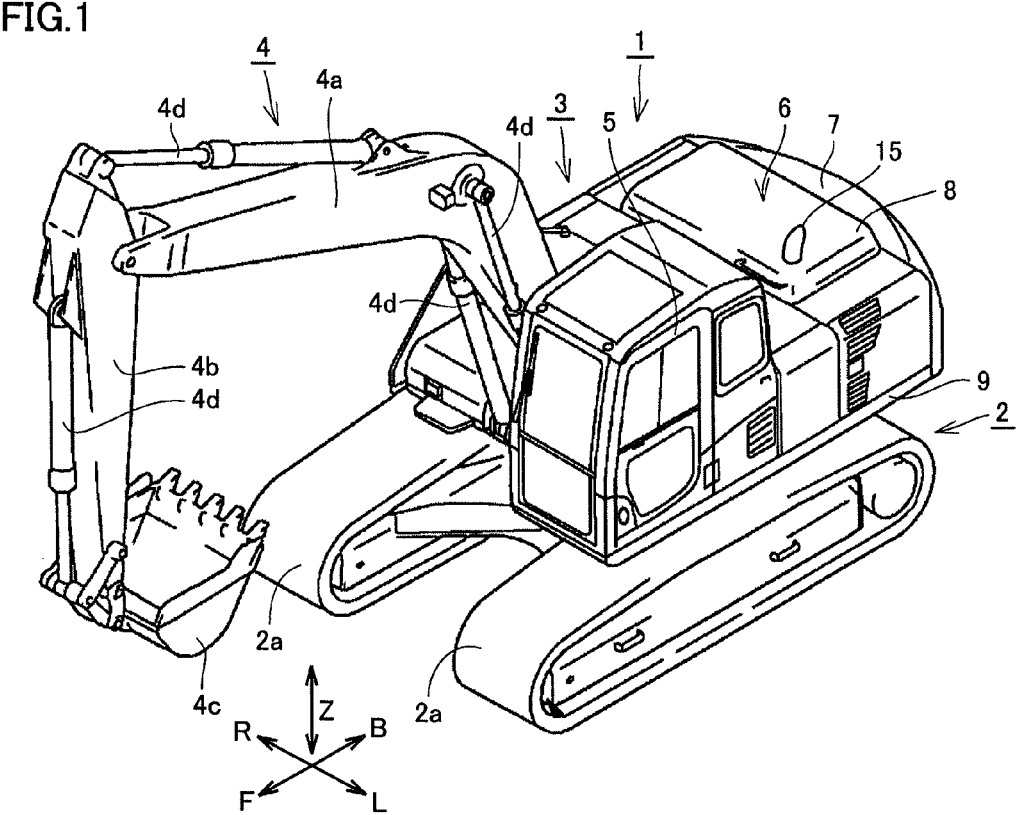
FIG. 1 is a perspective view schematically representing a configuration of a work vehicle according to one embodiment of the present invention.

FIG. 1 is a perspective view schematically representing a configuration of a hydraulic excavator 1 as a work vehicle according to one embodiment of the present invention. Referring to FIG. 1, hydraulic excavator 1 mainly includes an undercarriage 2, an upper revolving unit 3, and a work implement 4. Undercarriage 2 and upper revolving unit 3 constitute a work vehicle main body.

Undercarriage 2 includes a pair of left and right crawler belts 2a. Undercarriage 2 is configured to be self-propelled by rotation of the pair of crawler belts 2a. Upper revolving unit 3 is freely-revolvably mounted on undercarriage 2.

Upper revolving unit 3 has on a left side L in a front side F (vehicle front side) a cab 5 constituting a space for allowing an operator to operate hydraulic excavator 1. Upper revolving unit 3 has in a back side B (vehicle back side) an engine compartment 6 for accommodating an engine, and a counter weight 7. In the present embodiment, when in the state where an operator is seated in cab 5, a front side (front face side) of the operator is referred to as a front side F of upper revolving unit 3, and the opposite side therefrom, in other words, a back side of the operator is referred to as a back side of upper revolving unit 3. A left side of the operator in the seated state is referred to as a left side L of upper revolving unit 3, and a right side of the operator is referred to as a right side R of upper revolving unit 3. In the following, the front/back and left/right directions of upper revolving unit 3 are assumed to be matched with the front/back and left/right directions of a work vehicle. Further, upward and downward directions of the operator are noted by the arrow Z in the drawings.

Upper revolving unit 3 has a revolving frame 9. Revolving frame 9 is included in a work vehicle main body. Revolving frame 9 is arranged above undercarriage 2 and provided to be freely revolvable with respect to undercarriage 2. Work implement 4, cab 5, and counter weight 7 are mounted on revolving frame 9 and arranged on an upper face of revolving frame 9. Hydraulic excavator 1 includes a revolving device, which is not illustrated in the drawings, for allowing upper revolving unit 3 to revolve relative to undercarriage 2. The revolving device is constituted of a revolving motor supported by undercarriage 2, gears supported by revolving frame 9, and the like.

Work implement 4 which performs operation such as excavating earth is pivotally supported by upper revolving unit 3 so as to be operable in upward and downward directions Z. Work implement 4 has a boom 4a attached to an approximately central portion in front side F of upper revolving unit 3 so as to be operable in upward and downward directions Z, an arm 4b attached to a leading end portion of boom 4a so as to be operable in forward and backward directions F, B, and a bucket 4c attached to a leading end portion of arm 4b so as to be operable in forward and backward directions F, B. Boom 4*a*, arm 4*b*, and bucket 4*c* are configured so as to be driven respectively by a hydraulic cylinder 4*d*.

Work implement 4 is provided on right side R relative to cab 5. Relative to cab 5 arranged on left side L in front side F of upper revolving unit 3, work implement 4 is provided on right side R of cab 5 which is one side of cab 5. The arrangement of cab 5 and work implement 4 is not limited to the example shown in FIG. 1. For example, work implement 4 may be provided on the left side of cab 5 which is arranged on the front right side of upper revolving unit 3.

Engine compartment 6 is provided above revolving frame 9 so as to be adjacent to front side F of counter weight 7. Revolving frame 9 forms a floor portion of engine compartment 6. Engine compartment 6 is covered with an engine hood 8 from an upper side. Engine hood 8 forms a ceiling portion of engine compartment 6.

Counter weight 7 is arranged on back side B of engine compartment 6 and forms a wall of back side B of engine compartment 6. An exhaust stack 15 for discharging exhaust gas discharged from the engine to outside of hydraulic excavator 1 protrudes upward from engine hood 8.

Counter weight 7 is provided at a back end portion of revolving frame 9 to retain a vehicle balance of hydraulic excavator 1 during excavation and the like. Counter weight 7 is provided at back side B of engine compartment 6 on revolving frame 9. Counter weight 7 is formed, for example, by placing scrap iron and concrete in a box formed by assembling steel plates. The back face of counter weight 7 constitutes a surface of back side B of hydraulic excavator 1 and has a smoothly curved shape.

Figure 2:
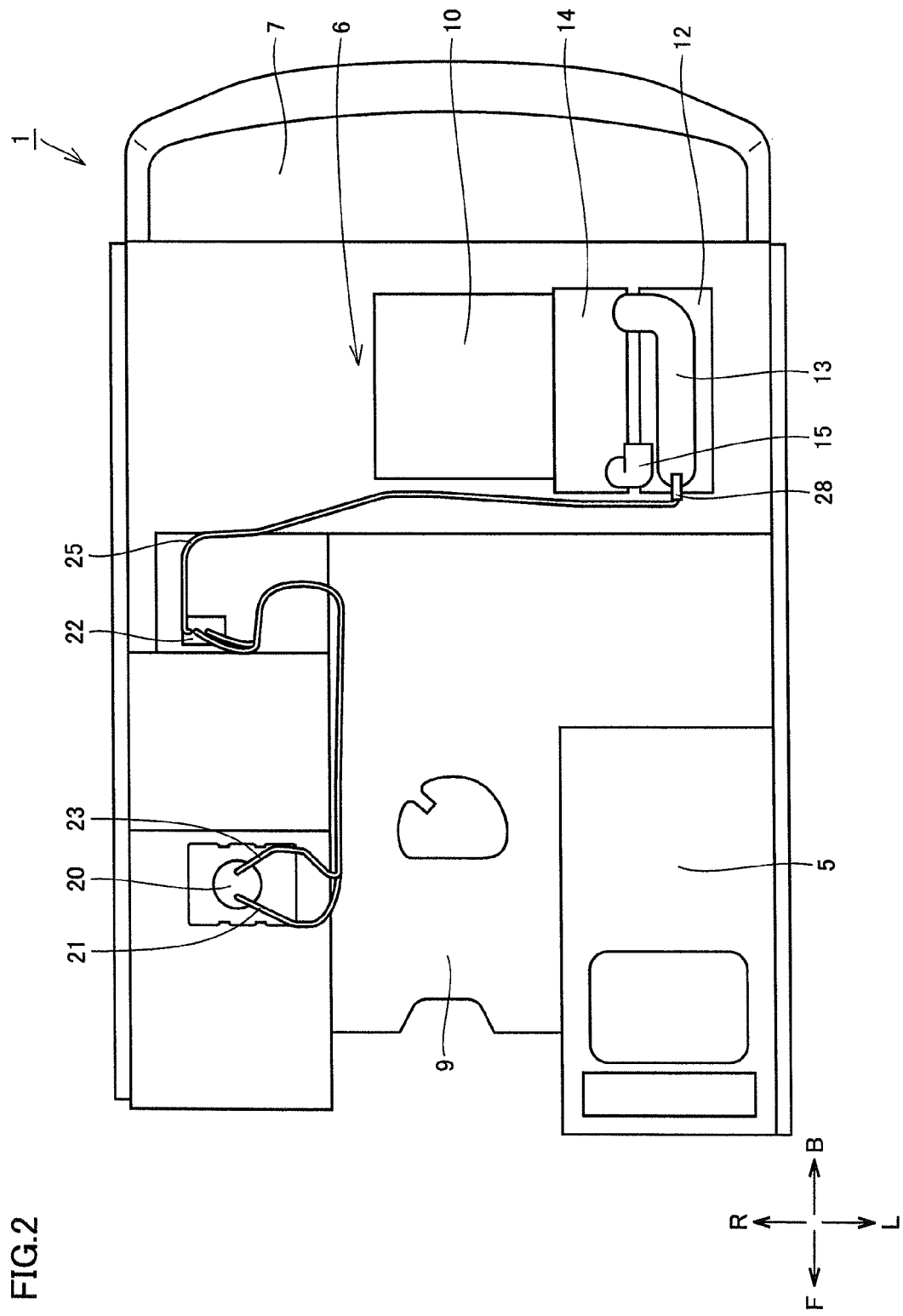
FIG. 2 is a plan view representing a path of a reducing agent pipe from a reducing agent tank to an exhaust gas treatment unit on a revolving frame in the work vehicle shown in FIG. 1.

Next, a path of a reducing agent pipe from a reducing agent tank to an exhaust gas treatment unit in the work vehicle of the present embodiment will be described with reference to FIG. 2. FIG. 2 is a plan view showing a path of the reducing agent pipe from the reducing agent tank to the exhaust gas treatment unit on revolving frame 9 in work vehicle (hydraulic excavator) 1 shown in FIG. 1. Referring to FIG. 2, hydraulic excavator 1 includes an engine 10 which is a power source for driving undercarriage 2 and work implement 4. Engine 10 is mounted on revolving frame 9. Engine 10 is mounted on revolving frame 9, particularly in a back portion of a center frame provided at a central location in the leftward and rightward directions. Engine 10 is accommodated in engine compartment 6.

Hydraulic excavator 1 includes in an engine compartment 6 an exhaust gas treatment unit for treating and purifying an exhaust gas discharged from engine 10. The exhaust gas treatment unit is arranged above engine 10 and mainly includes exhaust gas treatment devices 12, 14, an intermediate connection pipe 13, an exhaust stack 15, and an injection nozzle 28 for the reducing agent. Exhaust gas treatment device 12 is connected to engine 10 by an exhaust pipe 11 (FIG. 3) which will be described later. Exhaust gas treatment device 14 is connected to exhaust gas treatment device 12 by intermediate connection pipe 13. The exhaust gas discharged from engine 10 passes through exhaust gas treatment devices 12, 14 sequentially and is discharged to an atmosphere from exhaust stack 15. With respect to a flow of discharging of the exhaust gas from engine 10, exhaust gas treatment device 12 is arranged on a downstream side of engine 10, and exhaust gas treatment device 14 is arranged on a downstream side of exhaust gas treatment device 12.

Exhaust gas treatment device 12 collects particulates contained in the exhaust gas discharged from engine 10 to lower a concentration of particulates contained in the exhaust gas. Exhaust gas treatment device 12 is, for example, a diesel particulate filter device. Exhaust gas treatment device 14 reduces nitrogen oxide contained in the exhaust gas by a reaction with the reducing agent to cause a chemical change of nitrogen oxide into harmless nitrogen gas and lower the concentration nitrogen oxide contained in the exhaust gas. Exhaust gas treatment device 14 is, for example, an $NO_x$ removal device of a selective catalytic reduction type. Intermediate connection pipe 13 is provided with an injection nozzle 28 for injecting the reducing agent into intermediate connection pipe 13. Intermediate connection pipe 13 serves as a mixing pipe for injecting the reducing agent to the exhaust gas and mixing them.

Hydraulic excavator 1 further includes a reducing agent supply portion for supplying the reducing agent to the exhaust gas treatment unit. The reducing agent supply portion includes a reducing agent tank 20 and a reducing agent pump 22. Reducing agent tank 20 and reducing agent pump 22 are mounted on revolving frame 9, particularly on a side frame on right side R. Reducing agent pump 22 is arranged on front side F of engine compartment 6. Reducing agent tank 20 is arranged on front side F from reducing agent pump 22. Reducing agent tank 20 stores the reducing agent to be used in exhaust gas treatment device 14. For example, an aqueous urea solution is favorably used as the reducing agent. However, the reducing agent is not limited to this.

Reducing agent tank 20 and reducing agent pump 22 are coupled to one another by a feed pipe 21 and a return pipe 23. Feed pipe 21 is a pipe for feeding the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to one another by a pressure feed pipe 25. Pressure feed pipe 25 is a pipe for transferring the reducing agent from reducing agent pump 22 to injection nozzle 28.

The reducing agent transferred from reducing agent tank 20 to reducing agent pump 22 via feed pipe 21 is branched off into two paths at reducing agent pump 22. The reducing agent which is not used for the exhaust gas treatment returns from reducing agent pump 22 to reducing agent tank 20 via return pipe 23. The reducing agent which is used for the exhaust gas treatment reaches injection nozzle 28 from reducing agent pump 22 via pressure feed pipe 25 and is sprayed from injection nozzle 28 into intermediate connection pipe 13.

The exhaust gas from engine 10 flows into exhaust gas treatment device 14 via intermediate connection pipe 13. Intermediate connection pipe 13 is provided on an upstream side of exhaust gas treatment device 14 in the flow of the exhaust gas. The reducing agent sucked out from reducing agent tank 20 is injected to the exhaust gas flowing in intermediate connection pipe 13 via injection nozzle 28 attached to intermediate connection pipe 13. The reducing agent is injected to an upstream side of exhaust gas treatment device 14 in a flow of the exhaust gas. The amount of the reducing agent injected to the exhaust gas is controlled based on the temperature of the exhaust gas passing through exhaust gas treatment device 14 and on the concentration of nitrogen oxide contained in the exhaust gas.

Figure 3:
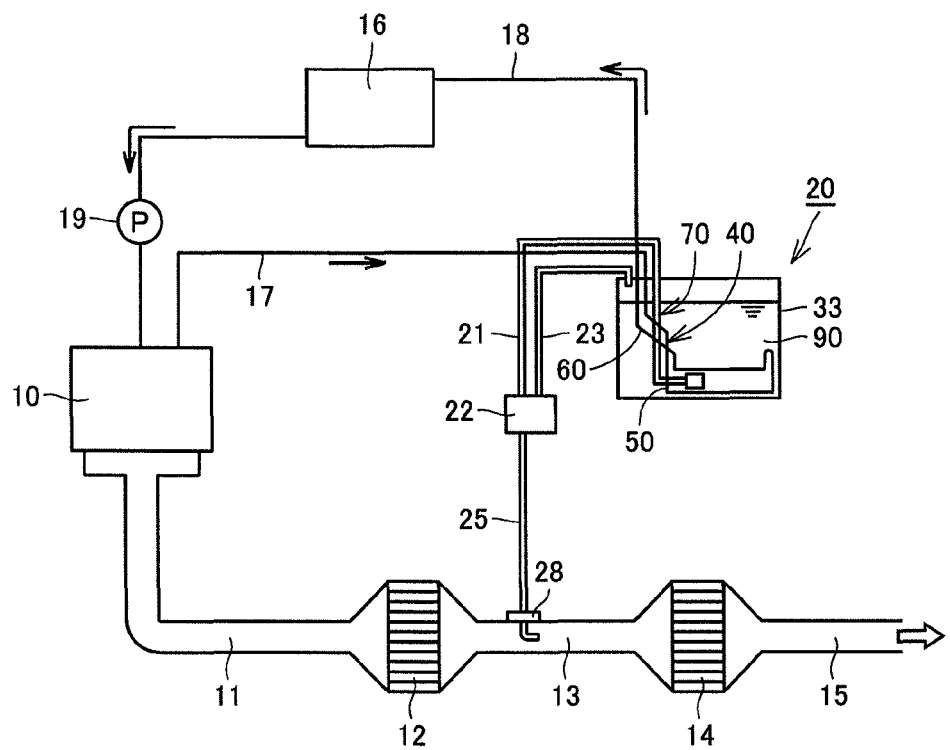
FIG. 3 is a functional diagram schematically representing a path of a reducing agent, a path of a medium for heat exchange, and an exhaust path of exhaust gas from an engine in the work vehicle shown in FIG. 1.

Next, a path of a medium for heat exchange and a path of the reducing agent in the work vehicle of the present embodiment will be described with reference to FIG. 3. FIG. 3 is a functional diagram schematically representing a path of the reducing agent, a path of the medium for heat exchange, and an exhaust path of the exhaust gas from the engine in the work vehicle of the present embodiment. As shown in FIG. 3, the exhaust gas discharged from engine 10 sequentially passes through exhaust pipe 11, exhaust gas treatment device 12, intermediate connection pipe 13, and exhaust gas treatment device 14, and then is discharged to outside of the vehicle from exhaust stack 15. Injection nozzle 28 is provided at intermediate connection pipe 13 on an upstream side of exhaust gas treatment device 14 in the flow of the exhaust gas.

Reducing agent tank 20 has a container main body 33 for storing a reducing agent 90. In container main body 33, a suction pipe 70 is arranged through which reducing agent 90 flowing out from reducing agent tank 20 flows. Suction pipe 70 is coupled to feed pipe 21. Reducing agent 90 sucked out from reducing agent tank 20 is transferred by reducing agent pump 22, passes through feed pipe 21 and pressure feed pipe 25 sequentially, and then reaches injection nozzle 28. Reducing agent 90 which is not used in the exhaust gas treatment returns from reducing agent pump 22 to reducing agent tank 20 via return pipe 23.

Injection nozzle 28 serves as a reducing agent injection device which injects reducing agent 90 sucked out from reducing agent tank 20 to an upstream side of the exhaust gas relative to exhaust gas treatment device 14. Injection nozzle 28 supplies reducing agent 90 to the exhaust gas which flows in intermediate connection pipe 13. In exhaust gas treatment device 14, nitrogen oxide contained in the exhaust gas reacts with reducing agent 90, so that the concentration of nitrogen oxide contained in the exhaust gas is reduced. When reducing agent 90 is an aqueous urea solution, the aqueous urea solution is dissolved and changed to ammonia in intermediate connection pipe 13, and nitrogen oxide is dissolved into harmless nitrogen and oxygen by a reaction between nitrogen oxide and ammonia. The exhaust gas with the amount of nitrogen oxide lowered to an appropriate value is discharged from exhaust stack 15.

In reducing agent tank 20, a heat exchanger 40 is arranged through which a medium (heat exchange medium) for heat exchange with reducing agent 90 flows. As the heat exchange medium, a cooling water for engine 10 is used. Heat exchanger 40 has a first pipeline 50 for guiding the heat exchange medium to reducing agent tank 20 and a second pipeline 60 for allowing the heat exchange medium to flow out from reducing agent tank 20. First pipeline 50 is coupled to a cooling water pipe 17. Second pipeline 60 is coupled to a cooling water pipe 18. Cooling water pipe 18 is provided with a radiator 16 and a cooling water pump 19.

Driving of cooling water pump 19 causes the cooling water of engine 10 to circulate through engine 10, heat exchanger 40, radiator 16, and cooling water pump 19. The cooling water heated in engine 10 undergoes heat exchange with reducing agent 90 at heat exchanger 40 so as to be cooled. On the other hand, reducing agent 90 receives heat from the cooling water so as to be heated. Radiator 16 is a heat exchanger for cooling the cooling water by performing heat exchange between the cooling water and air. The cooling water cooled in radiator 16 flows to a water jacket of engine 10, so that engine 10 is cooled appropriately.

Figure 4:
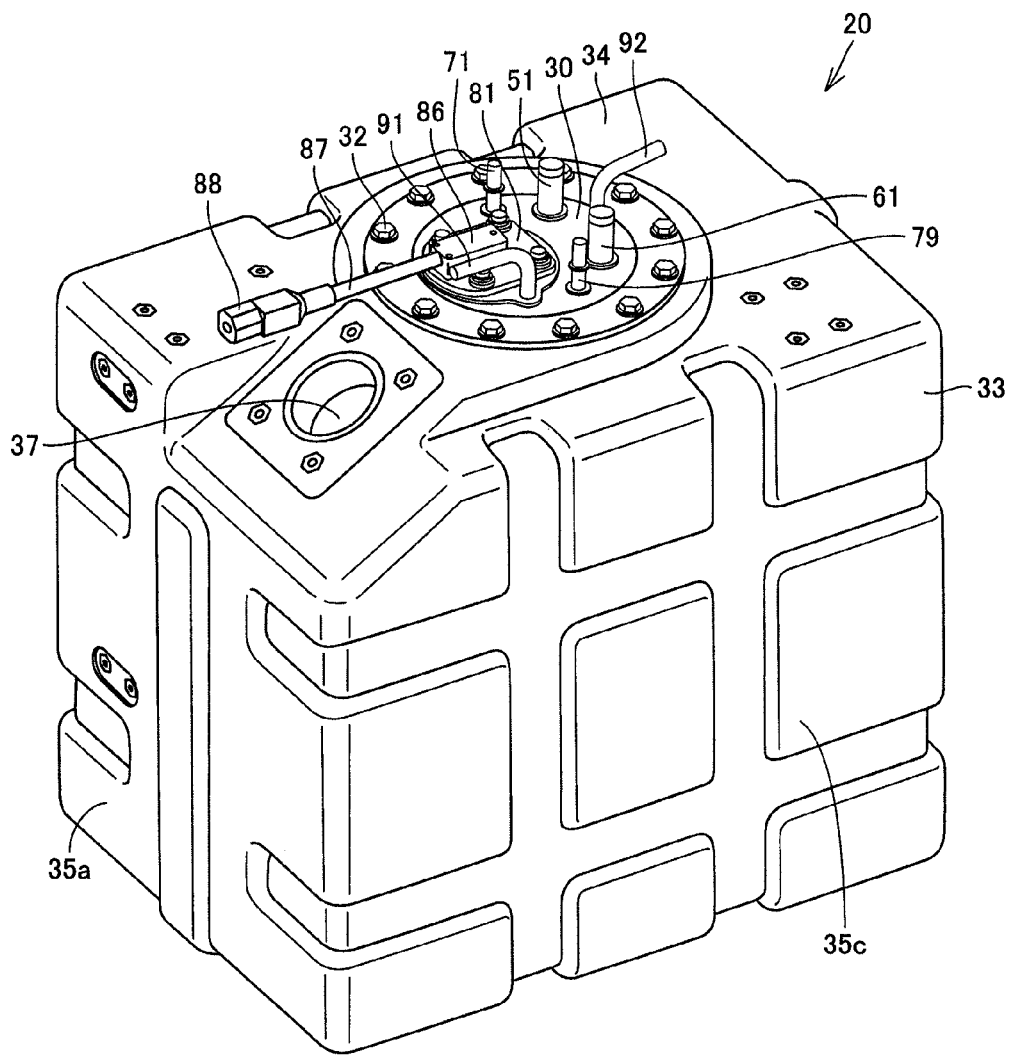
FIG. 4 is a perspective view schematically representing a configuration of the reducing agent tank.

In the following, a configuration of reducing agent tank 20 will be described in detail. FIG. 4 is a perspective view schematically representing a configuration of reducing agent tank 20 in the embodiment of the present invention. As shown in FIG. 4, reducing agent tank 20 has a hollow container main body 33. Container main body 33 has an approximately rectangular box-like outer shape. Container main body 33 is constituted of an upper face 34, side faces 35a, 35c, side faces 35b, 35d which are not illustrated in FIG. 4, and a bottom face 36 which is not illustrated in FIG. 4. Container main body 33 constitutes a space for storing the reducing agent between upper face 34 and bottom face 36. Container main body 33 is integrally formed by resin material such as polyethylene which is superior in corrosion resistance.

A replenishing port 37 for replenishing the reducing agent and an opening 31 (FIG. 6) which is not illustrated in FIG. 4 but described later are formed in upper face 34 of container main body 33. Opening 31 is closed by a disc-like top cover 30. In a periphery of opening 31, a plurality of bottomed bolt holes for fastening bolts 32 are formed. In an outer peripheral portion of top cover 30, a plurality of through holes penetrating through top cover 30 in a thickness direction are formed. Top cover 30 is detachably attached to container main body 33 by bolts 32 as fastening members. A sealing member such as an O-ring is formed between upper face 34 and top cover 30. Accordingly, opening 31 is sealed in a liquid-tight manner in the state where top cover 30 is fixed on upper face 34. Top cover 30 is formed of, for example, metal material which is superior in stiffness.

Penetrating portions 51, 61 are attached to top cover 30. Penetrating portions 51, 61 constitute a part of the heat exchanger which performs heat exchange with the reducing agent. A medium flowing into container main body 33 flows through penetrating portion 51. A medium flowing out from container main body 33 flows through penetrating portion 61.

An outflow port 71 which allows the reducing agent to flow out from container main body 33 and a return port 79 which allows the reducing agent to return to container main body 33 are attached to top cover 30. The end portion of feed pipe 21 shown in FIGS. 2 and 3 is coupled to outflow port 71. The end portion of return pipe 23 shown in FIGS. 2 and 3 is coupled to return port 79.

An attachment sheet 81 is detachably fastened to top cover 30 by bolts. Attachment sheet 81 supports a base portion 86 for a sensor which measures a level of the reducing agent, a concentration of the reducing agent, and a temperature of the reducing agent in container main body 33. A harness 87 is provided so as to protrude from base portion 86. A connector 88 is provided at a leading end of harness 87. Measured values of the level, concentration, and the temperature of the reducing agent are outputted to a controller, which is not illustrated in the drawings, via harness 87 and connector 88.

An air vent hole 91 and a breather 92 are attached to top cover 30. When the reducing agent is replenished from replenishing port 37 to container main body 33, air which is present in container main body 33 flows out of container main body 33 via air vent hole 91. Breather 92 is provided so as to automatically maintain a constant air pressure in container main body 33. When the air in container main body 33 expands or contracts due to a change in an ambient temperature, air is discharged or taken in via breather 92, so that a constant pressure in container main body 33 can be maintained.

Figure 5:
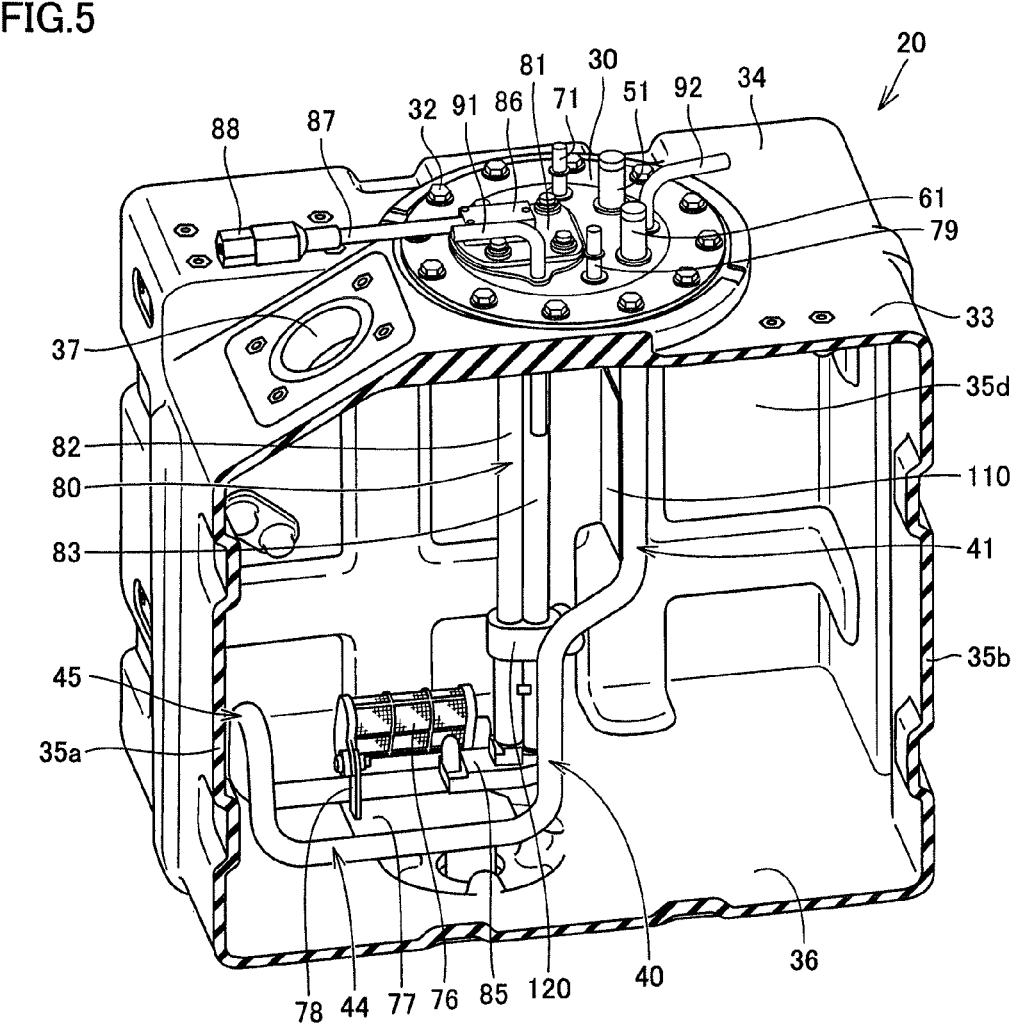
FIG. 5 is a partially-broken cross-sectional view representing a partially-broken reducing agent tank.

FIG. 5 is a partially-broken cross-sectional view representing a partially-broken reducing agent tank shown in FIG. 4. Referring to FIG. 5, container main body 33 has a side face 35b opposing side face 35a, a side face 35d opposing side face 35c shown in FIG. 4, and a bottom face 36 opposing upper face 34. Side face 35a and side face 35b are provided approximately in parallel. Side face 35c and side face 35d are provided approximately in parallel. Upper face 34 and bottom face 36 are provided approximately in parallel.

Figure 6:
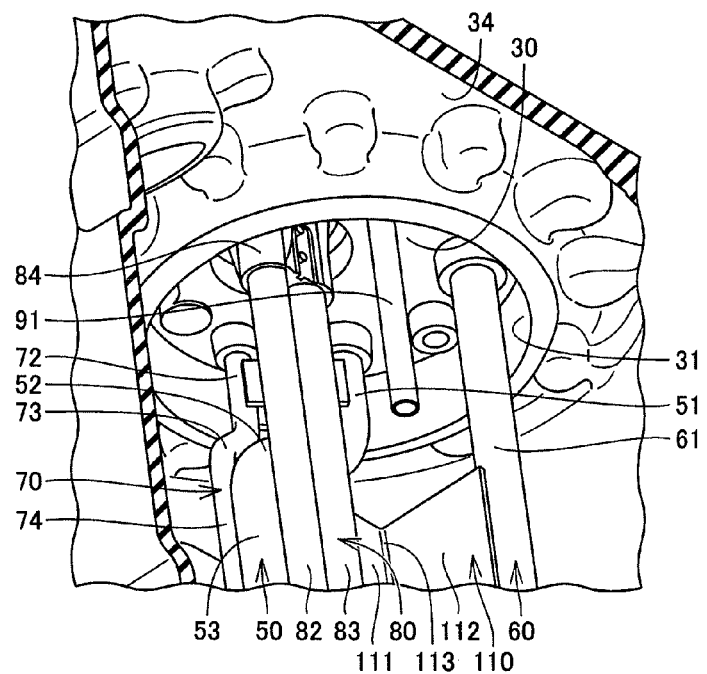
FIG. 6 is a perspective view representing an upper face of the reducing agent tank viewed from below.

FIG. 6 is a perspective view representing upper face 34 of reducing agent tank 20 viewed from below. Referring to FIG. 6, upper face 34 of container main body 33 of reducing agent tank 20 has an opening 31 penetrating through upper face 34. Opening 31 is formed to be circular. Top cover 30 described above covers opening 31 from above to close opening 31. The diameter of opening 31 is smaller than the diameter of top cover 30 closing opening 31. Penetrating portions 51, 61 fixed to top cover 30 penetrates through upper face 34 of container main body 33 and extends in a direction toward bottom face 36 from upper face 34 of container main body 33. Penetrating portions 51, 61 extend in the direction orthogonal to upper face 34 and bottom face 36. Penetrating portions 51, 61 extend in the direction orthogonal to disc-like top cover 30.

Figure 7:
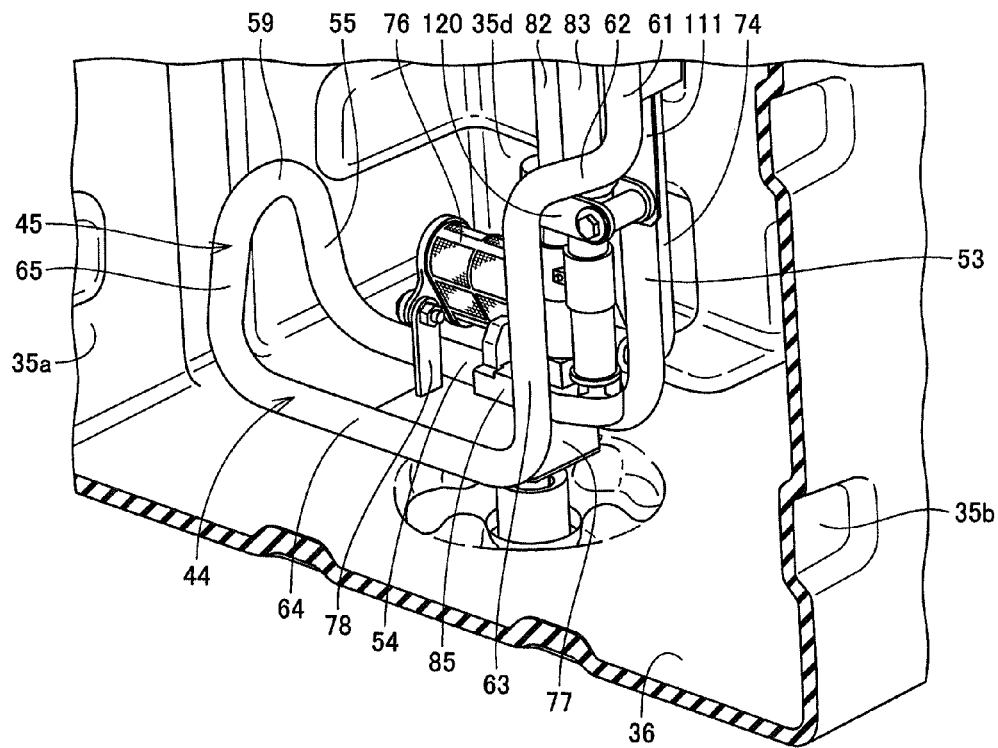
FIG. 7 is an enlarged perspective view representing a periphery of a leading end of the heat exchanger inside of the reducing agent tank.
Figure 8:
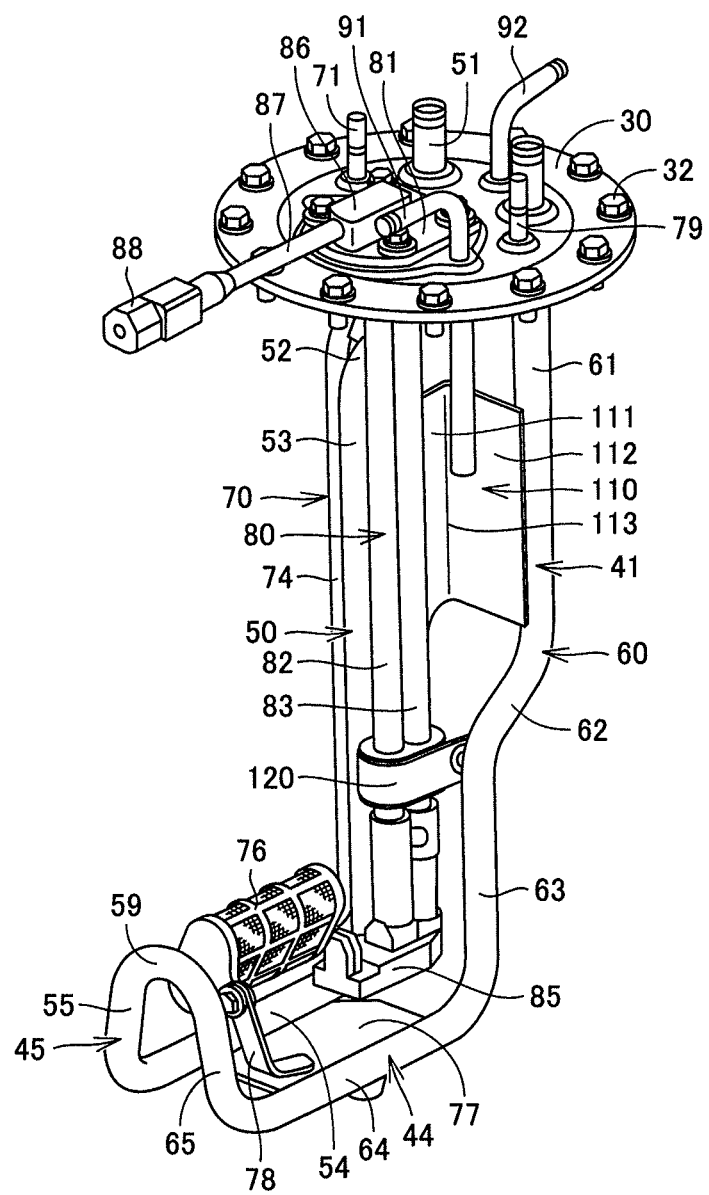
FIG. 8 is a perspective view representing an arrangement of the heat exchanger with a suction pipe and a sensor unit.

FIG. 7 is an enlarged perspective view representing a periphery of a leading end of heat exchanger 40 in reducing agent tank 20. FIG. 8 is a perspective view representing the arrangement of heat exchanger 40, suction pipe 70, and sensor unit 80. Referring to FIGS. 5 to 8 as needed, reducing agent tank 20, particularly the configuration arranged in container main body 33 will be described.

In container main body 33 of reducing agent tank 20, heat exchanger 40 is arranged through which a medium for heat exchange with the reducing agent flows. Details as to the structure of heat exchanger 40 will be described later.

In container main body 33, a suction pipe 70 (FIG. 6) is arranged which sucks out reducing agent 90 stored in container main body 33. Suction pipe 70 has outflow port 71 attached to top cover 30. Suction pipe 70 has an upper suspended portion 72, an inclined portion 73, and a lower suspended portion 74. Upper suspended portion 72 extends from top cover 30 so as to be suspended on the same straight line with outflow port 71. Inclined portion 73 is connected to a lower end of upper suspended portion 72, and extends on a side leaving apart from top cover 30 in inclination relative to upper suspended portion 72. Lower suspended portion 74 is connected to a lower end of inclined portion 73 and extends in parallel with upper suspended portion 72.

Upper suspended portion 72 and lower suspended portion 74 extend in parallel with side faces 35a to 35d of container main body 33 and extend perpendicularly to upper face 34 and bottom face 36 of container main body 33. Inclined portion 73 extends in a direction of inclining relative to upper face 34, side faces 35a to 35d, and bottom face 36 of container main body 33.

Further, suction pipe 70 has an extension portion 75 (refer to FIG. 12) and a strainer (filter) 76. Extension portion 75 is connected to a lower end of lower suspended portion 74, and extends toward side face 35a along bottom face 36 of container main body 33. Strainer 76 forms a leading end portion of suction pipe 70. The reducing agent stored in container main body 33 flows into suction pipe 70 via strainer 76. Strainer 76 is provided to filter out impurities in container main body 33 to prevent impurities from flowing into suction pipe 70. As shown in FIG. 5, strainer 76 is arranged close to bottom face 36 of container main body 33 so that the reducing agent can be sucked out through suction pipe 70 even when the amount of the reducing agent in container main body 33 becomes small.

A support plate 77 is placed on bottom face 36 of container main body 33. A plate-like support portion 78 protrudes from support plate 77 toward upper face 34 of container main body 33. In the vicinity of the leading end of plate-like support portion 78, strainer 76 is fixed to plate-like support portion 78 by a bolt. Strainer 76 is supported on bottom face 36 of container main body 33 through support plate 77 and plate-like support portion 78. Accordingly, the stiffness of suction pipe 70 is improved.

In container main body 33, a sensor unit 80 is arranged. Sensor unit 80 has a harness 82, a level sensor 83, and a concentration/temperature sensor 85. Harness 82 and level sensor 83 are attached to a lower face of top cover 30 by a holder 84. Harness 82 and level sensor 83 extend toward bottom face 36 of container main body 33 so as to be suspended from top cover 30. Concentration/temperature sensor 85 is attached at lower ends of harness 82 and level sensor 83.

Level sensor 83 has a float therein. The float is positioned on a liquid surface of the reducing agent. A level of the reducing agent in container main body 33 is detected based on height position information of the float. Concentration/temperature sensor 85 measures a concentration and a temperature of the reducing agent. A signal associated with measured values of the level, concentration, and temperature of the reducing agent is transmitted to base portion 86 shown in FIGS. 4 and 5 via harness 82 and outputted to a controller, which is not illustrated in the drawings, further via harness 87 and connector 88.

Sensor unit 80 is supported on a heat transfer plate 110 through a clamp portion 120. Accordingly, the stiffness of sensor unit 80 is improved. Details about heat transfer plate 110 will be described later.

Figure 9:
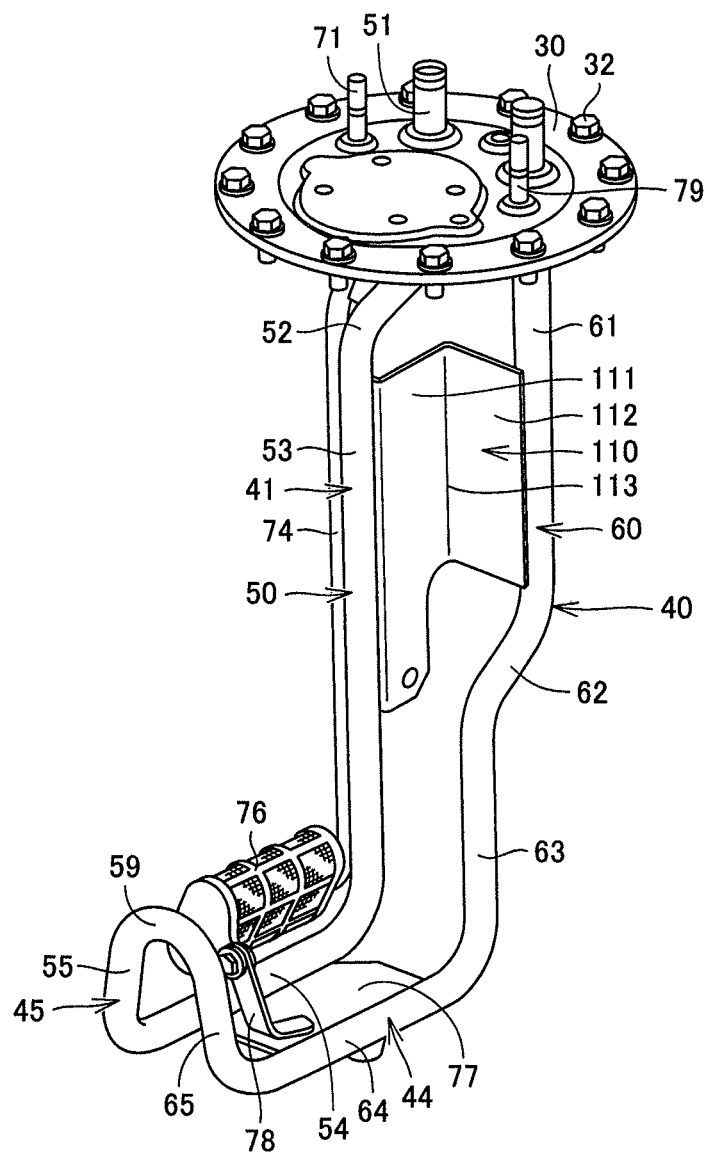
FIG. 9 is a perspective view representing the heat exchanger supported by the top cover.
Figure 10:
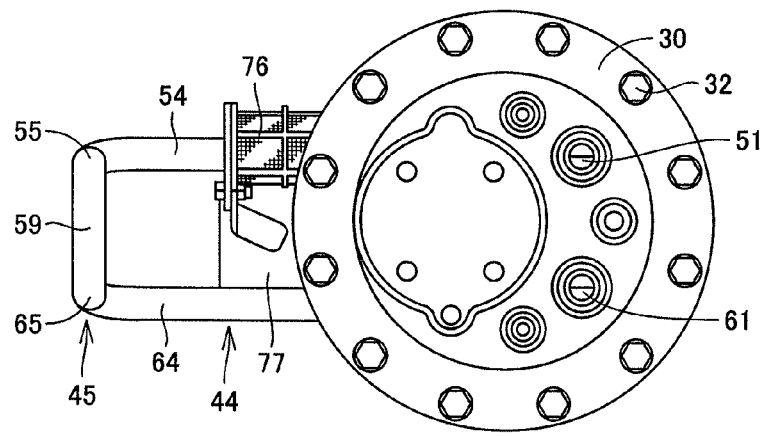
FIG. 10 is a plan view representing the top cover and the heat exchanger shown in FIG. 9.
Figure 11:
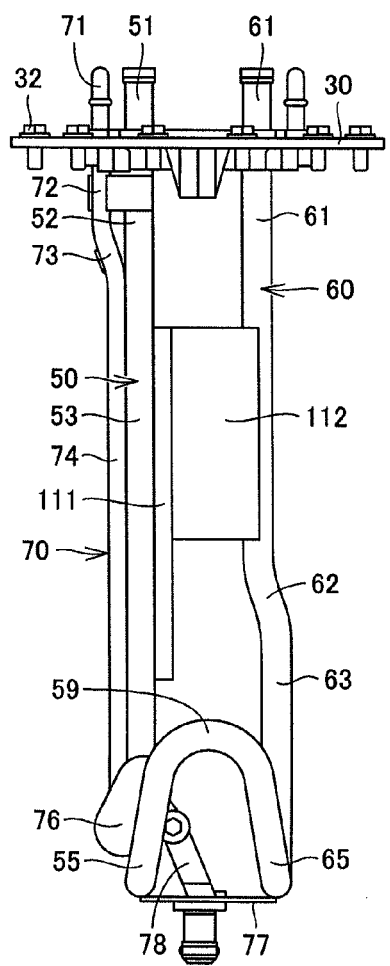
FIG. 11 is a side view representing the top cover and the heat exchanger shown in FIG. 9.
Figure 12:
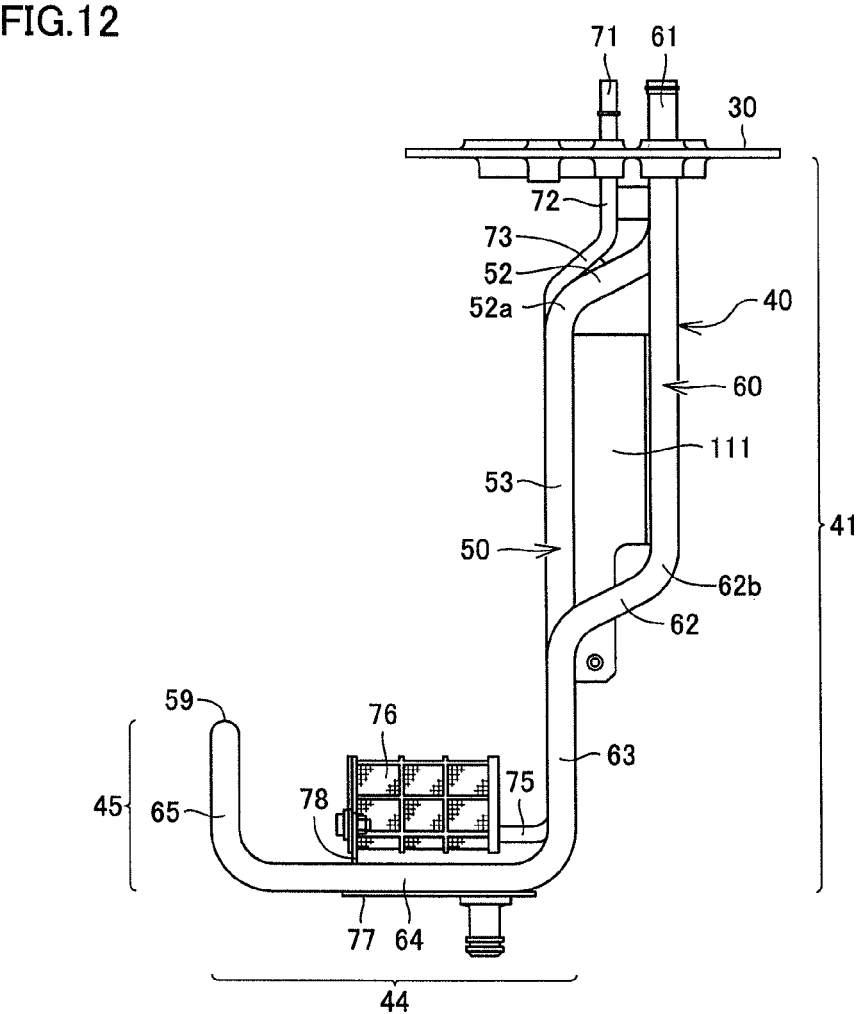
FIG. 12 is a front view representing the top cover and the heat exchanger shown in FIG. 9.

FIG. 9 is a perspective view representing heat exchanger 40 supported by top cover 30. FIG. 10 is a plan view representing top cover 30 and heat exchanger 40 shown in FIG. 9. FIG. 11 is a side view representing top cover 30 and heat exchanger 40 shown in FIG. 9. FIG. 12 is a front view representing top cover 30 and heat exchanger 40 shown in FIG. 9. Referring to FIGS. 9 to 12 and FIGS. 5 to 8 as needed, the structure of heat exchanger 40 which performs heat exchange with the reducing agent will be described.

Heat exchanger 40 has a suspended portion 41, a parallel portion 44, and a leading end bent portion 45. Suspended portion 41 is a portion of heat exchanger 40 extending from upper face 33 of container main body 33 toward bottom face 36. Parallel portion 44 is a portion of heat exchanger 40 which is joined to a lower end of suspended portion 41 and extends horizontally along bottom face 36 of container main body 33. Leading end bent portion 45 is joined to a leading end of parallel portion 44. Leading end bent portion 45 is bent relative to parallel portion 44 and extends upward along side face 35a of container main body 33. Leading end bent portion 45 forms a leading end portion of heat exchanger 40.

Suspended portion 41, parallel portion 44, and leading end bent portion 45 are formed integrally by bending an approximately U-shaped pipe member. Alternatively, heat exchanger 40 may be formed by joining pipe members respectively constituting suspended portion 41, parallel portion 44, and leading end bent portion 45 with welding, for example.

Viewing heat exchanger 40 from another point, heat exchanger 40 has a first pipeline 50 (FIG. 9) which guides the heat exchange medium into container main body 33, a second pipeline 60 which allows the heat exchange medium to flow out from container main body 33, and a turning portion 59. First pipeline 50 and second pipeline 60 communicate with each other through turning portion 59.

First pipeline 50 has a penetrating portion 51, an inclined portion 52, a lower suspended portion 53, an extension portion 54, and a rising portion 55. Penetrating portion 51 penetrates through upper face 34 of container main body 33 and extends into a space in container main body 33. Inclined portion 52 is connected to a lower end of penetrating portion 51. Inclined portion 52 is provided as a first inclined portion which inclines relative to penetrating portion 51 and extends toward the side of bottom face 36. Lower suspended portion 53 is connected to a lower end of inclined portion 52 and extends in parallel with penetrating portion 51.

Penetrating portion 51 and lower suspended portion 53 extend in parallel with side faces 35a to 35d of container main body 33 and extend perpendicularly to upper face 34 and bottom face 36 of container main body 33. Inclined portion 52 extends in a direction of inclining relative to upper face 34, side faces 35a to 35d, and bottom face 36 of container main body 33.

Extension portion 54 is joined to a lower end of lower suspended portion 53 and extends toward side face 35a of container main body 33 along bottom face 36 of container main body 33. Rising portion 55 is joined to a leading end of extension portion 54, and extends toward upper face 34 of container main body 33 along side face 35a of container main body 33.

Suspended portion 41 which extends from upper face 34 toward bottom face 36 of container main body 33 is configured to include penetrating portion 51, inclined portion 52, and lower suspended portion 53 of first pipeline 50. Two bent portions are formed in suspended portion 41 included in first pipeline 50, and these bent portions form inclined portion 52. Parallel portion 44 is configured to include extension portion 54 of first pipeline 50. Leading end bent portion 45 is configured to include rising portion 55 of first pipeline 50.

Second pipeline 60 has penetrating portion 61, an inclined portion 62, a lower suspended portion 63, an extension portion 64, and a rising portion 65. Penetrating portion 61 penetrates through upper face 34 of container main body 33 and extends into a space in container main body 33. Inclined portion 62 is connected to a lower end of penetrating portion 61. Inclined portion 62 is provided as a second inclined portion which inclines relative to penetrating portion 61 and extends toward the side of bottom face 36. Lower suspended portion 63 is connected to a lower end of inclined portion 62 and extends in parallel with penetrating portion 61.

Penetrating portion 61 and lower suspended portion 63 extend in parallel with side faces 35a to 35d of container main body 33 and extend perpendicularly to upper face 34 and bottom face 36 of container main body 33. Inclined portion 62 extends in a direction of inclining relative to upper face 34, side faces 35a to 35d, and bottom face 36 of container main body 33.

Extension portion 64 is joined to a lower end of lower suspended portion 63 and extends toward side face 35a of container main body 33 along bottom face 36 of container main body 33. Rising portion 65 is joined to a leading end of extension portion 64, and extends toward upper face 34 of container main body 33 along side face 35a of container main body 33.

Suspended portion 41 which extends from upper face 34 toward bottom face 36 of container main body 33 is configured to include penetrating portion 61, inclined portion 62, and lower suspended portion 63 of second pipeline 60. Two bent portions are formed in suspended portion 41 included in second pipeline 60, and these bent portions form inclined portion 62. Parallel portion 44 is configured to include extension portion 64 of second pipeline 60. Leading end bent portion 45 is configured to include rising portion 65 of second pipeline 60.

Penetrating portions 51, 61 and lower suspended portions 53, 63 are arranged in parallel with each other. Extension portions 54, 64 are arranged in parallel with each other. Extension portions 54, 64 extend in a direction orthogonal to lower suspended portions 53, 63.

Leading end bent portion 45 is formed by rising portion 55 of first pipeline 50, rising portion 65 of second pipeline 60, and turning portion 59 allowing first pipeline 50 and second pipeline 60 to communicate with each other. Turning portion 59 is formed by a cross section of leading end bent portion 45 which is orthogonal to an extending direction of heat exchanger 40 at a point closest to upper face 34 of container main body 33 and which includes the closest point. Turning portion 59 is formed by a cross section of heat exchanger 40 which includes the point of leading end bent portion 45 closest to upper face 34 of container main body 33 and which is parallel to side faces 35c, 35d of container main body 33. Leading end bent portion 45 is formed to have an inverse U-shape.

In suspended portion 41, a distance between first pipeline 50 and second pipeline 60 is set to be approximately constant. In parallel portion 44, a distance between first pipeline 50 and second pipeline 60 is set to be approximately constant. In leading end bent portion 45, a distance between first pipeline 50 and second pipeline 60 becomes smaller as coming closer to turning portion 59.

As shown in FIG. 8, inclined portion 52 included in first pipeline 50 and inclined portion 62 included in second pipeline 60 are inclined relative to penetrating portions 51, 61 so as to come close to sensor unit 80 as leaving apart from penetrating portions 51, 61. Sensor unit 80 is arranged between lower suspended portion 53 of first pipeline 50 and lower suspended portion 63 of second pipeline 60. Heat exchanger 40 is arranged close to sensor unit 80 so that more efficient heat transfer is performed with respect to sensor unit 80 and the reducing agent in a periphery of sensor unit 80.

Inclined portion 73 (FIG. 6) of suction pipe 70 through which the reducing agent flows is inclined relative to upper suspended portion 72 so as to come close to first pipeline 50 as leaving apart from upper suspended portion 72. Lower suspended portion 74 of suction pipe 70 is arranged in parallel with lower suspended portion 53 of first pipeline 50 and extends along lower suspended portion 53 of first pipeline 50. A distance between lower suspended portion 53 of first pipeline 50 and lower suspended portion 74 of suction pipe 70 is minimized. For example, a distance between lower suspended portions 53, 74 may be smaller than or equal to an outer diameter of the pipe forming first pipeline 50. Heat exchanger 40 is arranged close to suction pipe 70 so that more efficient heat transfer is performed with respect to suction pipe 70 and the reducing agent in a periphery of suction pipe 70.

Strainer 76 provided at a leading end of suction pipe 70 is arranged so as to be covered at side portions in two directions with suspended portion 41 and leading end bent portion 45 of heat exchanger 40 and at a lower side with parallel portion 44. By arranging heat exchanger 40 in a periphery of strainer 76, heat transfer to the reducing agent in the vicinity of strainer 76 is performed preferentially, so that the reducing agent in the vicinity of strainer 76 can be thawed preferentially when the reducing agent is frozen.

A length of penetrating portion 51 of first pipeline 50 is shorter than a length of penetrating portion 61 of second pipeline 60. Inclined portion 52 of first pipeline 50 and inclined portion 62 of second pipeline 60 are arranged approximately in parallel with each other. Inclined portion 52 of first pipeline 50 is arranged closer to upper face 34 of container main body 33 than inclined portion 62 of second pipeline 60. Inclined portion 62 of second pipeline 60 is arranged at a position different from inclined portion 52 of first pipeline 50 in the extending direction of penetrating portions 51, 61.

Suspended portion 41 of heat exchanger 40 is attached to top cover 30 which closes opening 31 and suspended from top cover 30. When viewed from a thickness direction of top cover 30, suspended portion 41 is arranged inside of a circle forming opening 31. Inclined portions 52, 62 are inclined relative to penetrating portions 51, 61 in the region corresponding to a projection of opening 31 along the extending direction of penetrating portions 51, 61. Accordingly, suspended portion 41 can be taken out from container main body 33 via opening 31 by detaching top cover 30 from upper face 34 of container main body 33 and lifting top cover 30 in the direction orthogonal to upper face 34 (in the direction perpendicular to the sheet of FIG. 10).

As shown in FIG. 12, an end portion 52a of inclined portion 52 of first pipeline 50 on a side leaving apart from penetrating portion 51 is arranged closer to upper face 34 of container main body 33 than an end portion 62b of inclined portion 62 of second pipeline 60 on a side close to penetrating portion 61. In the extending direction of penetrating portions 51, 61, inclined portion 52 of first pipeline 50 and inclined portion 62 of second pipeline 60 are arranged with a distance apart from each other.

As shown in FIG. 9, a heat transfer plate 110 is provided across both first pipeline 50 and second pipeline 60. Heat transfer plate 110 has a flat plate-shaped first flat plate portion 111 and a flat plate-shaped second flat plate portion 112. Heat transfer plate 110 has a bent portion 113 which connects first flat plate portion 111 with second flat plate portion 112. Heat transfer plate 110 is formed by bending one flat plate.

Heat transfer plate 110 is provided between inclined portion 52 of first pipeline 50 and inclined portion 62 of second pipeline 60 in the extending direction of penetrating portions 51, 61. First flat plate portion 111 is fixed at lower suspended portion 53 on a side more apart from upper face 34 of container main body 33 than inclined portion 52 for example by welding. Second flat plate portion 112 is fixed at penetrating portion 61 on a side closer to container main body 33 than inclined portion 62 for example by welding. Heat transfer plate 110 is fixed at both of first pipeline 50 and second pipeline 60.

At a lower end portion of first flat plate portion 111, a clamp portion 120 (FIG. 8) is attached. Clamp portion 120 surrounds a periphery of harness 82 and level sensor 83 of sensor unit 80 to support sensor unit 80. Heat exchanger 40, heat transfer plate 110, and sensor unit 80 form a three-dimensional support structure. Accordingly, the stiffness of heat exchanger 40 and sensor unit 80 is improved.

Next, the effect of the present embodiment will be described.

According to reducing agent tank 20 of the present embodiment, as shown in FIG. 6, heat exchanger 40 includes penetrating portions 51, 61 which penetrate through upper face 34 of container main body 33 and extend into an internal space of container main body 33. As shown in FIGS. 9 and 12, heat exchanger 40 includes inclined portion 52 which is inclined relative to penetrating portions 51, 61 and extends toward a side of bottom face 36, and inclined portion 62 which is inclined relative to penetrating portions 51, 61 at a position different from inclined portion 52 in the extending direction of penetrating portions 51, 61 and extends toward a side of bottom face 36.

When the temperature of the reducing agent is lowered, the cooling water heated in engine 10 circulates into heat exchanger 40. The cooling water which flows in heat exchanger 40 is higher in temperature than the reducing agent stored in container main body 33. Therefore, heat radiation from heat exchanger 40 to the reducing agent is performed. Inclined portions 52, 62 are provided, so that a path length of heat exchanger 40 becomes longer, and a surface area of heat exchanger 40 is increased. A heat transfer area from heat exchanger 40 to the reducing agent can be increased, so that the heat transfer efficiency to the reducing agent can be improved.

Inclined portions 52, 62 are arranged at different positions in the extending direction of penetrating portions 51, 61, so that the position at which inclined portion 52 radiates heat and the position at which inclined portion 62 radiates heat are differed in the height direction of container main body 33 of reducing agent tank 20. Thus, unevenness in the heat transfer to the reducing agent in the height direction of reducing agent tank 20 can be reduced, so that heat can be transferred to the reducing agent without unevenness in the height direction of reducing agent tank 20.

Further, heat exchanger 40 includes first pipeline 50 and second pipeline 60. As shown in FIG. 3, first pipeline 50 is a path which guides the cooling water for engine 10 into container main body 33. Second pipeline 60 is a path which allows the cooling water for engine 10 to flow out from container main body 33. As shown in FIG. 9, inclined portion 52 is included in first pipeline 50, and inclined portion 62 is included in second pipeline 60. In such a manner, in the planar view of container main body 33, the positions at which inclined portions 52, 62 radiate heat can be differed. Accordingly, unevenness in the heat transfer to the reducing agent can be reduced more effectively.

Further, as shown in FIG. 9, inclined portion 52 is arranged closer to upper face 34 of container main body 33 than inclined portion 62. The cooling water immediately after flowing into container main body 33 flows to inclined portion 52, and the cooling water after flowing through the path from first pipeline 50 to lower suspended portion 63 flows to inclined portion 62. Therefore, the temperature of the cooling water flowing through inclined portion 52 is higher than the temperature of the cooling water flowing through inclined portion 62. Heat is radiated to the reducing agent from inclined portion 52 through which the cooling water with higher temperature flows, so that the reducing agent in a periphery of opening 31 can be heated efficiently.

Further, as shown in FIG. 12, end portion 52a of inclined portion 52 on a side of leaving apart from penetrating portion 51 is arranged closer to upper face 34 of container main body 33 than end portion 62b of inclined portion 62 on a side close to penetrating portion 61. In such a manner, inclined portions 52, 62 can be arranged without overlapping in the height direction of reducing agent tank 20, so that the position at which inclined portion 52 radiates heat and the position at which inclined portion 62 radiates heat can be arranged more apart from each other. Thus, unevenness in the heat transfer to the reducing agent can be reduced effectively.

Further, as shown in FIGS. 8 and 11, reducing agent tank 20 further includes suction pipe 70 which sucks out the reducing agent stored in container main body 33. Suction pipe 70 includes a portion which extends along first pipeline 50. In such a manner, the reducing agent flowing in suction pipe 70 can be heated efficiently, so that freezing of the reducing agent in suction pipe 70 can be suppressed more securely. Since suction pipe 70 can extend along first pipeline 50 for a long distance by arranging inclined portion 52 closer to upper face 34 of container main body 33 than inclined portion 62, so that reducing agent tank 20 which is advantageous in thawing of suction pipe 70 and prevention of freezing of suction pipe 70 can be achieved.

A direction of inclination of inclined portion 52 included in first pipeline 50 relative to penetrating portion 51 is a direction of coming closer to suction pipe 70 as leaving apart from penetrating portion 51. Inclined portion 52 is inclined relative to penetrating portion 51 so as to come close to suction pipe 70 as leaving apart from penetrating portion 51. By inclining first pipeline 50 in such a manner, lower suspended portion 53 of first pipeline 50 can be arranged so as to extend along lower suspended portion 74 of suction pipe 70. By arranging first pipeline 50 close to suction pipe 70, heat transfer can be performed efficiently to suction pipe 70 and the reducing agent in a periphery of suction pipe 70.

Further, as shown in FIG. 8, reducing agent tank 20 further includes sensor unit 80 which extends from upper face 34 to bottom face 36 of container main body 33. Inclined portions 52, 62 come closer to sensor unit 80 as leaving apart from penetrating portions 51, 61.

Both heat exchanger 40 and sensor unit 80 are attached to top cover 30 and arranged apart at positions of top cover 30. When heat exchanger 40 is bent in container main body 33, and inclined portions 52, 62 are arranged to come close to sensor unit 80, lower suspended portions 53, 63 below inclined portions 52, 62 are arranged to extend along sensor unit 80. Accordingly, heat can be transferred efficiently to sensor unit 80 and the reducing agent in a periphery of sensor unit 80, so that the defect of deteriorating the detection accuracy of sensor unit 80 caused by freezing of the reducing agent can be avoided. Thus, the detection accuracy of the state of the reducing agent by sensor unit 80 can be improved.

Referring to FIGS. 2 and 3, hydraulic excavator 1 as a work vehicle of the present embodiment includes engine 10, an exhaust gas treatment device 14 which performs treatment to an exhaust gas from engine 10 by a reductive reaction, reducing agent tank 20 described above, and injection nozzle 28 which injects the reducing agent sucked out from reducing agent tank 20 to the exhaust gas guided to exhaust gas treatment device 14. Accordingly, hydraulic excavator 1 can be provided which includes reducing agent tank 20 capable of improving the heat transfer efficiency to the reducing agent and transferring heat to the reducing agent without unevenness.

FIGS. 13 to 18 schematically represent examples of the arrangement of first pipeline 50 and second pipeline 60. As shown in FIGS. 13 to 18, inclined portion 52 of first pipeline 50 has end portion 52a on a side of leaving apart from penetrating portion 51 and end portion 52b on a side close to penetrating portion 51. Inclined portion 62 of second pipeline 60 has end portion 62a on a side of leaving apart from penetrating portion 61 and end portion 62b on a side close to penetrating portion 61. Penetrating portions 51, 61 are arranged so as to extend downward from opening 31 of container main body 33.

Figure 13:
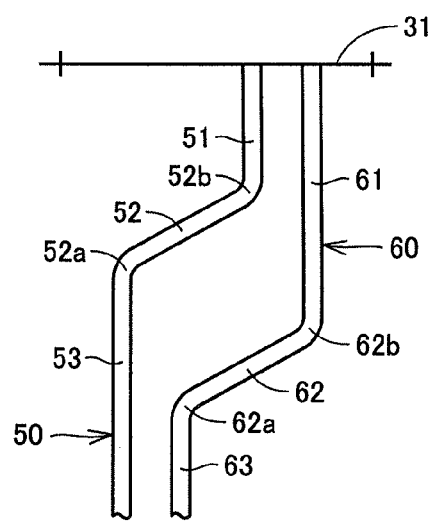
FIG. 13 schematically represents a first example of an arrangement of a first pipeline and a second pipeline.

In the description of the embodiment above, an example is described in which end portion 52a of inclined portion 52 on the side of leaving apart from penetrating portion 51 is arranged closer to upper face 34 of container main body 33 than end portion 62b of inclined portion 62 on the side close to penetrating portion 61 as shown in FIG. 13. Inclined portions 52, 62 of the present embodiment are not limited to such arrangement. In other words, inclined portions 52, 62 are all necessary to be arranged at positions different from one another in the extending direction of penetrating portions 51, 61.

Figure 14:
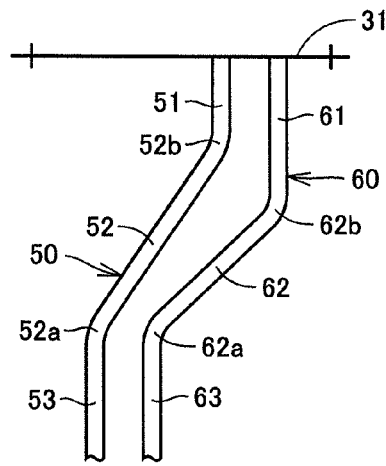
FIG. 14 schematically represents a second example of the arrangement of the first pipeline and the second pipeline.
Figure 15:
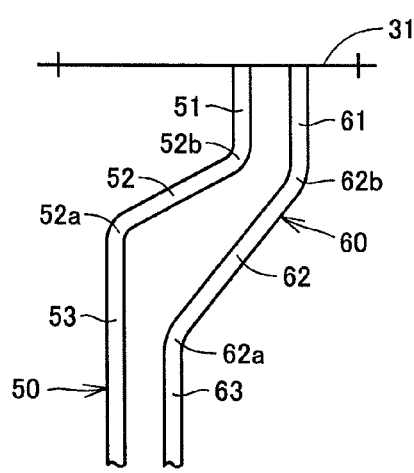
FIG. 15 schematically represents a third example of the arrangement of the first pipeline and the second pipeline.
Figure 16:
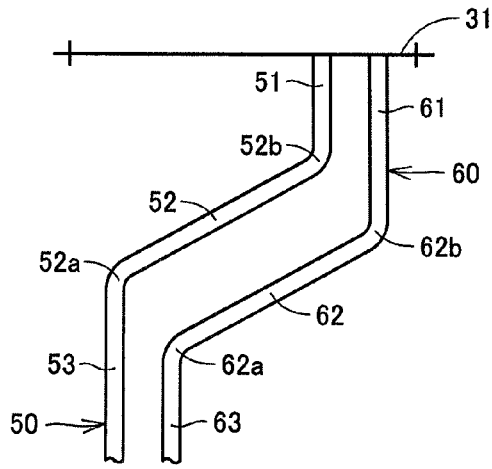
FIG. 16 schematically represents a fourth example of the arrangement of the first pipeline and the second pipeline.
Figure 17:
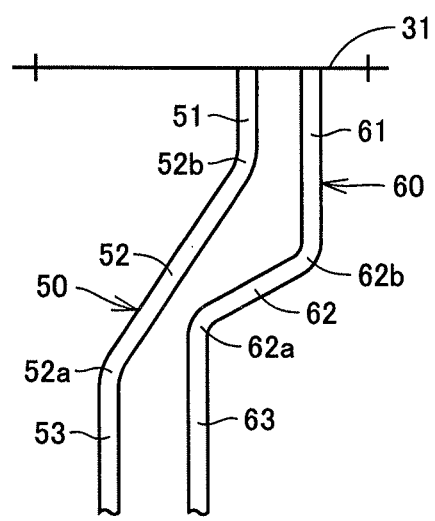
FIG. 17 schematically represents a fifth example of the arrangement of the first pipeline and the second pipeline.

In the case where inclined portions 52, 62 are arranged at different positions one another, the forms shown in FIGS. 14 to 17 are also included. Specifically, the case where inclined portions 52, 62 are arranged at different positions includes the case shown in FIG. 14 where end portions 52a, 62a are apart from opening 31 by the same distance, but a distance between each of end portions 52b, 62b and opening 31 differs, and end portion 62b is apart from opening 31 more than end portion 52b. Further, the case shown in FIG. 15 is also included where end portions 52b, 62b are apart from opening 31 by the same distance, but a distance between each of end portions 52a, 62a and opening 31 differs, and end portion 62a is apart from opening 31 more than end portion 52a. Further, the case shown in FIG. 16 is also included where end portion 62b is apart from opening 31 more than end portion 52b, and end portion 52a is apart from opening 31 more than end portion 62b, and end portion 62a is apart from opening 31 more than end portion 52a. Further, the case shown in FIG. 17 is also included where end portion 62b is apart from opening 31 than end portion 52b, and end portion 52a is apart from opening 31 than end portion 62a.

Inclined portions 52, 62 may be arranged at positions where inclined portions 52, 62 do not overlap in the extending direction of penetrating portions 51, 61 as shown in FIG. 13. Further, as shown in FIGS. 14 to 16, inclined portions 52, 62 may be arranged at positions partially overlapping with each other in the extending direction of penetrating portions 51, 61. Further, as shown in FIG. 17, inclined portions 52, 62 may be arranged such that a whole part of one of inclined portions 52, 62 overlap with the other.

The arrangement in which inclined portion 52 is arranged closer to upper face 34 of container main body 33 than inclined portion 62 is the concept which includes both of the case where a whole part of inclined portion 52 is arranged closer to upper face 34 than inclined portion 62 as shown in FIG. 13, and the case where a part of inclined portion 52 is arranged closer to upper face 34 than inclined portion 62 as shown in FIGS. 14 to 16, and it should be understood that a part of inclined portion 52 is allowed to overlap with inclined portion 62.

Inclination angles of inclined portions 52, 62 relative to penetrating portions 51, 61 may be equal to each other as shown in FIGS. 13 and 16. Alternatively, the inclination angle of inclined portion 52 relative to penetrating portion 51 may be different from the inclination angle of inclined portion 62 relative to penetrating portion 61 as shown in FIGS. 14, 15, and 17.

Figure 18:
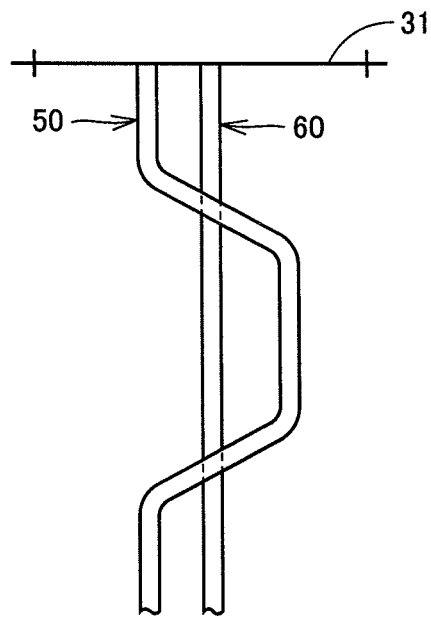
FIG. 18 schematically represents a sixth example of the arrangement of the first pipeline and the second pipeline.

Further, in the description above, an example was described in which both first pipeline 50 and second pipeline 60 are provided with inclined portions. However, the configuration is not limited to those. As shown in FIG. 18, it may be so configured that first pipeline 50 is bent at four or more locations to provide a plurality of inclined portions and on the other hand second pipeline 60 has a straight pipe shape without an inclined portion. Obviously, in place of the configuration shown in FIG. 18, first pipeline 50 may have a straight pipe shape, and second pipeline 60 may have a plurality of inclined portions. In other words, it is all necessary that any one of first pipeline 50 and second pipeline 60 has two inclined portions located at different positions in the extending direction of the penetrating portions.

The description above includes the following features.

(Feature 1)

A reducing agent tank, including:

a container main body which has an upper face and a bottom face and constitutes a space for storing a reducing agent between said upper face and said bottom face; and a heat exchanger which performs heat exchange with said reducing agent, said heat exchanger including a first pipeline which guides a heat exchange medium to said container main body and a second pipeline which allows the heat exchange medium to flow out from said container main body, at least any one of said first pipeline and said second pipeline has a penetrating portion which penetrates through said upper face and extends into said space, and an inclined portion which is inclined relative to said penetrating portion and extends toward a side of said bottom face, the reducing agent tank further including a heat transfer plate which is provided across both of said first pipeline and said second pipeline.

In such a manner, the heat transfer plate is heated by receiving heat transfer from the first pipeline and the second pipeline. In addition to the heat transfer from the heat exchanger to the reducing agent, heat radiation from the heat transfer plate to the reducing agent is performed. Providing the inclined portion increases a distance between the first pipeline and the second pipeline, and the heat transfer plate is arranged at a position with an increased distance between the first pipeline and the second pipeline, so that the heat transfer plate having a larger surface area is provided. The heat transfer area from the heat transfer plate to the reducing agent can be increased, so that the heat transfer efficiency to the reducing agent can be improved.

(Feature 2)

The reducing agent tank according to Feature 1, wherein said first pipeline has a first penetrating portion which penetrates and extends through said upper face, and a first inclined portion which is inclined relative to said first penetrating portion and extends toward a side of said bottom face, and said second pipeline has a second penetrating portion which penetrates and extends through said upper face, and a second inclined portion which is inclined relative to said second penetrating portion at a position different from said first inclined portion in an extending direction of said second penetrating portion and extends toward the side of said bottom face, and said heat transfer plate is provided between said first inclined portion and said second inclined portion in the extending direction of said first penetrating portion and said second penetrating portion.

In such a manner, the heat transfer plate is provided at a position where a space between the first pipeline and the second pipeline is large between the first inclined portion and the second inclined portion. Accordingly, the surface area of the heat transfer plate can be increased more. The heat transfer area from the heat transfer plate to the reducing agent can be increased, so that the heat transfer efficiency to the reducing agent can be improved.

(Feature 3)

The reducing agent tank according to Feature 1 or Feature 2, wherein said heat transfer plate is fixed at both of said first pipeline and said second pipeline.

By fixing the heat transfer plate at both of the first pipeline and the second pipeline for example by welding, a three-dimensional support structure can be formed, so that the stiffness of the heat exchanger can be improved. In the operation environment of the work vehicle, since the vibration transmitted to the reducing agent tank is greater, the reducing agent tank including the heat exchanger having a high stiffness may be particularly advantageously applied in the case where the reducing agent tank is mounted to the work vehicle.

(Feature 4)

The reducing agent tank according to any of Features 1 to 3, wherein said heat transfer plate includes a first flat plate portion engaged with the first pipeline, a second flat plate portion engaged with the second pipeline, and a bent portion connecting the first flat plate portion and the second flat plate portion.

In such a manner, the surface area of the heat transfer plate can be increased, and the heat transfer area from the heat transfer plate to the reducing agent can be increased, so that the heat transfer efficiency to the reducing agent can be further improved. In addition, by forming the heat transfer plate to have a shape of a bent plate, the stiffness of the heat transfer plate is improved, so that the stiffness of the heat exchanger can be further improved.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 hydraulic excavator; 4 work implement; 6 engine compartment; 10 engine; 11 exhaust pipe; 12, 14 exhaust gas treatment device; 13 intermediate connection pipe; 15 exhaust stack; 20 reducing agent tank; 21 feed pipe; 22 reducing agent pump; 23 return pipe; 25 pressure feed pipe; 28 injection nozzle; 30 top cover; 31 opening; 32 bolt; 33 container main body; 34 upper face; 35a to 35d side face; 36 bottom face; 40 heat exchanger; 41 suspended portion; 44 parallel portion; 45 leading end bent portion; 50 first pipeline; 51, 61 penetrating portion; 52, 62, 73 inclined portion; 52a, 52b, 62a, 62b end portion; 53, 63, 74 lower suspended portion; 54, 64, 75 extension portion; 55, 65 rising portion; 59 turning portion; 60 second pipeline; 70 suction pipe; 71 outflow port; 72 upper suspended portion; 76 strainer; 79 return port; 80 sensor unit; 82, 87 harness; 83 level sensor; 85 concentration/temperature sensor; 90 reducing agent; 110 heat transfer plate; 111 first flat plate portion; 112 second flat plate portion; 113 bent portion; 120 clamp portion.

The invention claimed is:

1. A reducing agent tank, comprising:

a container main body which has an upper face and a bottom face and constitutes an internal space for storing a reducing agent between said upper face and said bottom face;

a heat exchanger which performs heat exchange with said reducing agent, said heat exchanger including:

a penetrating portion which penetrates through said upper face and extends into said internal space, a first inclined portion which extends in a straight line and which is inclined relative to said penetrating portion at an obtuse angle and extends toward a side of said bottom face, a second inclined portion which extends in a straight line and which is inclined relative to said penetrating portion at an obtuse angle and at a position different from said first inclined portion in an extending direction of said penetrating portion and extends toward a side of said bottom face, and a suspended portion, a parallel portion, and a leading end bent portion, the suspended portion extending from the upper face toward the bottom face of the container main body, the parallel portion being joined to a lower end of the suspended portion and extending horizontally along the bottom face of the container main body, and the leading end bent portion being joined to a leading end of the parallel portion and being bent relative to the parallel portion and extending upward, the suspended portion including the penetration portion, the first inclined portion and the second inclined portion;

a suction pipe having a suction port on a leading end of the suction pipe that opens in the internal space of the container main body and that sucks out the reducing agent stored in the container main body; and a strainer provided on the suction port, wherein the strainer is arranged so as to be covered at side portions in two directions with the suspended portion and the leading end bent portion, and at a lower side with the parallel portion.

2. The reducing agent tank according to claim 1, wherein said heat exchanger includes a first pipeline which guides a heat exchange medium into said container main body and a second pipeline which allows the heat exchange medium to flow out from said container main body, and said first pipeline has said first inclined portion, and
said second pipeline has said second inclined portion.

3. The reducing agent tank according to claim 2, wherein an end portion of said first inclined portion on a side of leaving apart from said penetrating portion is arranged closer to said upper face than an end portion of said second inclined portion on a side close to said penetrating portion.

4. The reducing agent tank according to claim 3, further comprising a sensor unit which extends from said upper face to said bottom face, wherein at least one of said first inclined portion and said second inclined portion comes closer to said sensor unit as leaving apart from said penetrating portion.

5. The reducing agent tank according to claim 3, wherein in the extending direction of said penetrating portion, said first inclined portion and said second inclined portion are arranged with a distance apart from each other.

6. The reducing agent tank according to claim 2, further comprising a sensor unit which extends from said upper face to said bottom face, wherein at least one of said first inclined portion and said second inclined portion comes closer to said sensor unit as leaving apart from said penetrating portion.

7. The reducing agent tank according to claim 2, wherein in the extending direction of said penetrating portion, said first inclined portion and said second inclined portion are arranged with a distance apart from each other.

8. The reducing agent tank according to claim 2, wherein said first inclined portion is arranged closer to said upper face than said second inclined portion, and said suction pipe includes a portion which extends along said first pipeline.

9. The reducing agent tank according to claim 8, further comprising a sensor unit which extends from said upper face to said bottom face, wherein at least one of said first inclined portion and said second inclined portion comes closer to said sensor unit as leaving apart from said penetrating portion.

10. The reducing agent tank according to claim 8, wherein in the extending direction of said penetrating portion, said first inclined portion and said second inclined portion are arranged with a distance apart from each other.

11. The reducing agent tank according to claim 8, wherein an end portion of said first inclined portion on a side of leaving apart from said penetrating portion is arranged closer to said upper face than an end portion of said second inclined portion on a side close to said penetrating portion.

12. The reducing agent tank according to claim 11, further comprising a sensor unit which extends from said upper face to said bottom face, wherein at least one of said first inclined portion and said second inclined portion comes closer to said sensor unit as leaving apart from said penetrating portion.

13. The reducing agent tank according to claim 1, further comprising a sensor unit which extends from said upper face to said bottom face, wherein at least one of said first inclined portion and said second inclined portion comes closer to said sensor unit as leaving apart from said penetrating portion.

14. The reducing agent tank according to claim 1, wherein an end portion of said first inclined portion on a side of leaving apart from said penetrating portion and an end portion of said second inclined portion on a side of leaving apart from said penetrating portion are arranged at positions different from each other in an extending direction of said penetrating portion.

15. The reducing agent tank according to claim 14, wherein in the extending direction of said penetrating portion, said first inclined portion and said second inclined portion are arranged with a distance apart from each other.

16. The reducing agent tank according to claim 1, wherein in the extending direction of said penetrating portion, said first inclined portion and said second inclined portion are arranged with a distance apart from each other.

17. A work vehicle, comprising:
an engine;
an exhaust gas treatment device which performs treatment to an exhaust gas from said engine by a reductive reaction;
the reducing agent tank according to claim 1; and
a reducing agent injection device which injects said reducing agent sucked out from said reducing agent tank to said exhaust gas guided to said exhaust gas treatment device.

* * * * *